United States Patent
Waldmann

Patent Number: 6,045,239
Date of Patent: Apr. 4, 2000

[54] LAMP HINGE ASSEMBLY

[75] Inventor: Gerhard Waldmann, Dauchingen, Germany

[73] Assignee: Herbert Waldmann GmbH & Co., Germany

[21] Appl. No.: 09/127,754

[22] Filed: Aug. 3, 1998

[30] Foreign Application Priority Data

Aug. 4, 1997 [DE] Germany .............................. 197 33 713

[51] Int. Cl.[7] ........................................................ F21S 1/12
[52] U.S. Cl. ........................... 362/287; 362/413; 362/427; 362/418; 362/285; 362/431
[58] Field of Search .................................... 362/285, 287, 362/431, 414, 413, 418, 427

[56] References Cited

U.S. PATENT DOCUMENTS

| | | | |
|---|---|---|---|
| 4,381,538 | 4/1983 | Warshawsky | 362/287 |
| 4,390,933 | 6/1983 | Warshawsky | 362/413 |
| 4,449,169 | 5/1984 | Warshawsky | 362/413 |
| 4,449,171 | 5/1984 | Warshawsky | 362/413 |
| 4,453,204 | 6/1984 | Warshawsky | 362/396 |
| 4,484,255 | 11/1984 | Warshwasky | 362/413 |
| 5,772,172 | 6/1998 | Sampedro | 362/413 |

FOREIGN PATENT DOCUMENTS 86 19 907 U   7/1986   Germany.

*Primary Examiner*—Thomas M. Sember
*Attorney, Agent, or Firm*—Eugene E. Renz, Jr. P.C.

[57] ABSTRACT

Lamp hinge assembly for connecting a lamp pole part (10) to a lamp head part (16) so that they can pivot with respect to each other, comprising a stop screw permanently attached to one of the pivoting parts, a stop (28) permanently attached to the other pivoting part to limit the pivot angle between the lamp pole part (10) and the lamp head part (16), a stop disk, which rotates with the pivoting motion of the parts, inserted between the stop screw (14) and the stop (28), said stop disk (20) being provided with two radially projecting lobes (22, 24), which are separated from each other by a predetermined angle, and each of which comes to rest against one side of the stop (28), and in that, approximately midway between the lobes (22, 24), the disk has a stop tab (26), against either side of which the stop screw (14) can come to rest, depending on the position into which the parts (10, 16) have been pivoted.

4 Claims, 2 Drawing Sheets

LAMP HINGE ASSEMBLY

BACKGROUND OF THE INVENTION

Lamp hinge assemblies of the type to which the present invention relates are not new per se. For example, German Patent DE 86-19,907 U1 shows a lamp assembly wherein the lamp pole and the head of the lamp can pivot around an axis transverse to the direction in which the light is emitted by the head of the lamp which is restricted by stops to less than 360°. This is disadvantageous in certain applications in which a pivot range of 360° or more is desired.

SUMMARY OF THE INVENTION

According to the invention, therefore, a lamp hinge assembly which allows a pivot range between the lamp pole and the lamp head of at least 360° and preferably more than 360° is to be created. According to the invention, this goal is achieved by providing a stop screw permanently attached to one of the pivoting parts and a stop permanently attached to the other pivoting part to limit the pivot angle between the lamp pole and the lamp head. A stop disk, which rotates with the pivoting motion of the parts, is inserted between the stop screw and the stop. This disk is provided with two radially projecting lobes, which are separated from each other by a certain angle, and each of which comes to rest against one side of the stop. Approximately midway between the lobes, the disk has a stop tab, against either side of which the stop screw can come to rest, depending on the position into which the parts have been pivoted.

As a result of the co-rotating or co-traveling stop disk between the lamp pole and the lamp head, the stop permanently attached to the lamp head no longer comes to rest directly against the stop screw permanently attached to the pole so as to limit the pivot range. Instead, the distance between the two lobes on the stop disk—minus the angular width of the stop itself—results in an additional pivot range, which is added to the pivot range produced by the position of the stop screw permanently attached to the pole and the stop tab on the stop disk. Simply by selecting a suitable angular distance between the two lobes on the stop disk, it is therefore possible to expand the pivot range of the pivot hinge very easily to nearly any desired angular distances, including those greater than 360°.

In accordance with other features of the invention, it is possible within the scope of the preferred embodiment for the stop screw to be attached nonrotatably to the lamp pole, whereas the stop is free to pivot with the lamp head. Conversely, however, it is also possible in principle to fix the position of the lamp head by means of a stop screw and to attach the rotatable stop to the lamp pole, provided that this pole is suitably designed to accept it.

In accordance with still another features of the present invention, the friction between the pivoting parts and the stop disk is selectively adjustable by the selection of suitable shims.

BRIEF DESCRIPTION OF THE DRAWINGS

These and other objects of the present invention and various features and details of the operation and construction thereof are hereinafter more fully set forth with reference to the accompanying drawings, wherein.

DESCRIPTION OF THE METHOD AND SYSTEM

Figure 1:
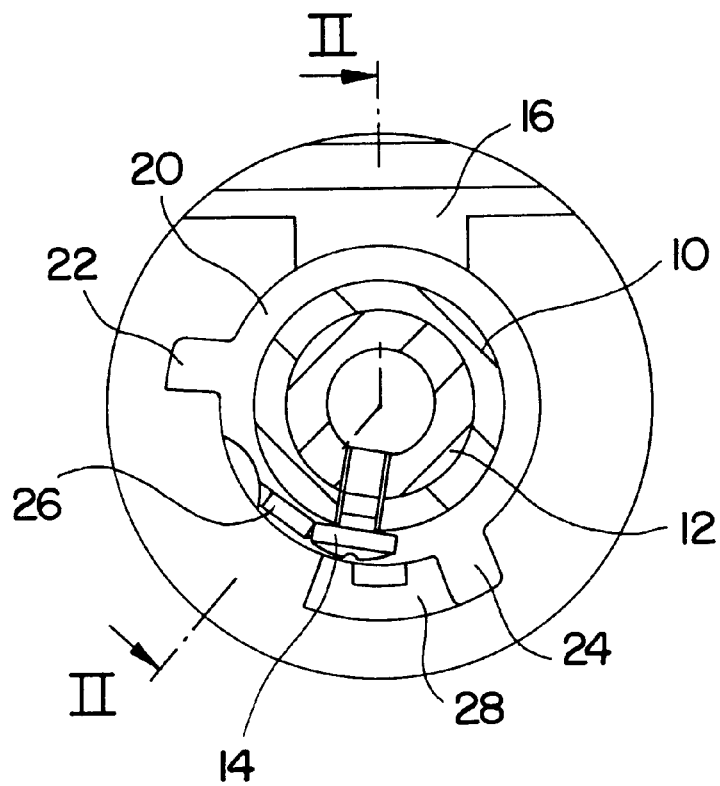
FIG. 1 shows a partial view of the lamp hinge with the lamp head, the lamp pole being cut away in the radial direction.
Figure 2:
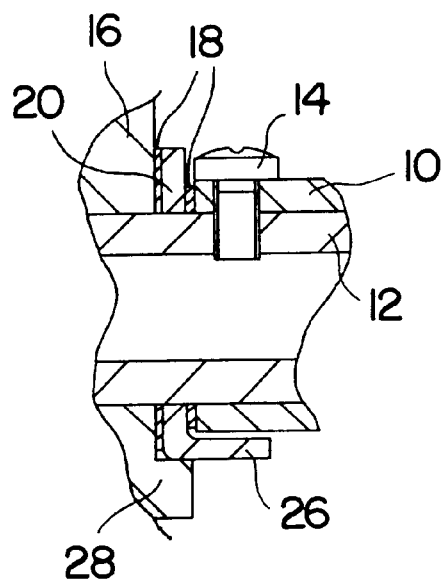
FIG. 2 shows a cross section along line II—II of FIG. 1.

Referring now to the drawings and particularly to FIGS. 1 and 2 thereof, the end of a tubular lamp pole 10 can be seen, into which a section of tubing 12 is inserted, where it is held in place by a stop screw 14. Lamp head 16, only the beginning part of which can be seen, is supported with freedom to rotate on tubing section 12. Between the end of lamp pole 10 and lamp head 16, a ring-shaped stop disk 20 is supported with freedom to rotate on tubing section 12. Friction-producing shims 18 are inserted between these various components. Stop disk 20 carries two radially projecting lobes 22, 24, which, in the illustrated embodiment, are at angle of approximately 140° to each other. Approximately midway between the two lobes 22, 24 an axially projecting stop tab 26 is bent down from the disk at a right angle. After lamp head 16 has completed its pivoting movement, covering approximately 325°, stop screw 14 can come to rest in the circumferential direction against either side of this tab. In FIG. 1, stop screw 14 is shown resting against one circumferential side of stop tab 26, whereas in the cross section of FIG. 2 it is shown rotated 180° in comparison with FIG. 1. This serves merely to clarify the presentation and plays no role with respect to the nature of the invention, because, in principle, it is also possible for lamp pole 10 to pivot and lamp head 16 to be fixed in contrast to the opposite case in which lamp head 16 pivots and a lamp pole 10 is fixed. What is essential is the maximum angular range around which the parts can pivot, which can also be derived from the diagram of FIG. 3, as will be explained further below.

Figure 3:
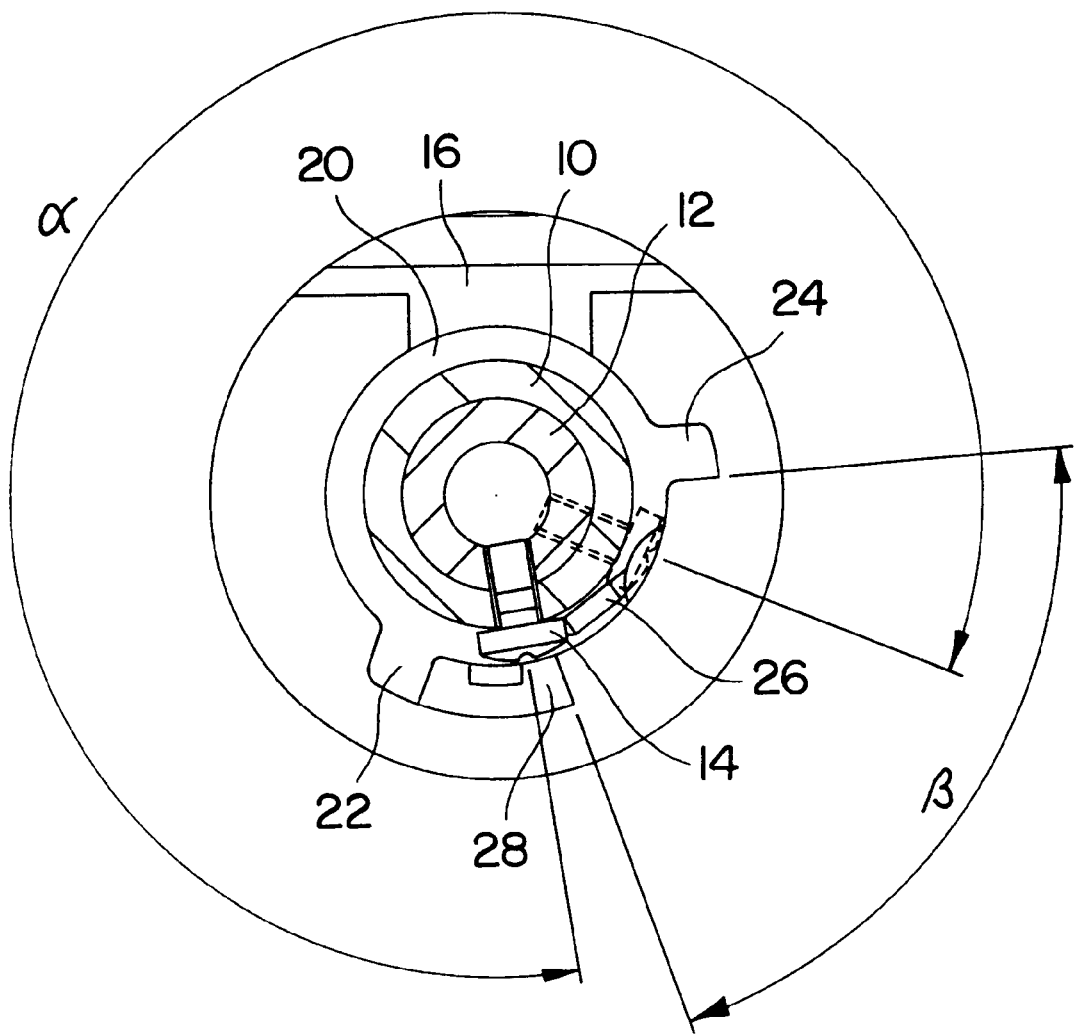
FIG. 3 shows a view corresponding to that of FIG. 1, except that, in FIG. 1, all the parts are shown pivoted into one extreme position, whereas all the parts in FIG. 3 are shown pivoted into the other extreme position.

A stop 28, which projects from the end surface of the lamp head toward lamp pole 10, is permanently attached to lamp head 16. Traveling in the circumferential direction, lobe 22 can come to rest against one side of this stop, as shown in FIG. 3, and lobe 24 can come to rest against the other side of the stop, as shown in FIG. 1. The stopping action of lobes 22, 24 acting in cooperation with stop 28 defines a pivot range β of about 100° for stop disk 20. At the same time, stop screw 14 can be adjusted around an angle α of about 300° between the stop position on one side of stop tab 26, shown in solid line in FIG. 3, and the stop position on the other side of stop tab 26, shown in broken line in FIG. 3. Together, therefore, a pivot range of α+β is obtained, which, in the illustrated embodiment, equals about 380°. By reducing or enlarging the angular distance between lobes 22 and 24 on stop disk 20, the total pivot range can be decreased or increased within wide limits as a function of the needs of the concrete application.

Even though a particular embodiment of the invention has been illustrated and described herein, it is not intended to limit the invention and changes and modifications may be made therein within the scope of the following claims for example. Instead of stop screw 14 in the lamp hinge according to the invention as illustrated in the drawing, it is also possible to select any other type and form of stop if it appears advantageous for the purpose of the application. This also applies to the type and form of the other stop devices, namely, of lobes 22 and 24, stop tab 26, and stop 28.

What is claimed is:

1. Lamp hinge assembly for connecting a lamp pole part (10) to a lamp head part (16) so that they can pivot with respect to each other, comprising a stop screw permanently attached to one of the pivoting parts, a stop (28) permanently attached to the other pivoting part to limit the pivot angle between the lamp pole part (10) and the lamp head part (16), a stop disk, which rotates with the pivoting motion of the parts, inserted between the stop screw (14) and the stop (28), said stop disk (20) being provided with two radially projecting lobes (22, 24), which are separated from each other by a predetermined angle, and each of which comes to rest against one side of the stop (28), and in that, approximately midway between the lobes (22, 24), the disk has a stop tab (26), against either side of which the stop screw (14) can come to rest, depending on the position into which the parts (10, 16) have been pivoted.

2. Lamp hinge assembly according to claim 1, characterized in that the stop screw (14) is permanently attached, without freedom to rotate, to the lamp pole (10), and in that the stop (28) is permanently attached to the pivoting lamp head (16).

3. Lamp hinge assembly according to claim 1, characterized in that the stop screw (14) is permanently attached, without freedom to rotate, to the pivoting lamp head (16), and in that the stop (28) is permanently attached to the lamp pole (10).

4. Lamp hinge assembly according to claim 1, characterized in that a friction-adjusting shim (18) is inserted between the lamp pole (10) and the stop disk (20) and/or between the stop disk (20) and the lamp head (16).

* * * * *